May 18, 1954     M. J. ARVIN     2,678,774
THERMOMAGNETIC CONTROL DEVICE
Filed Oct. 18, 1950
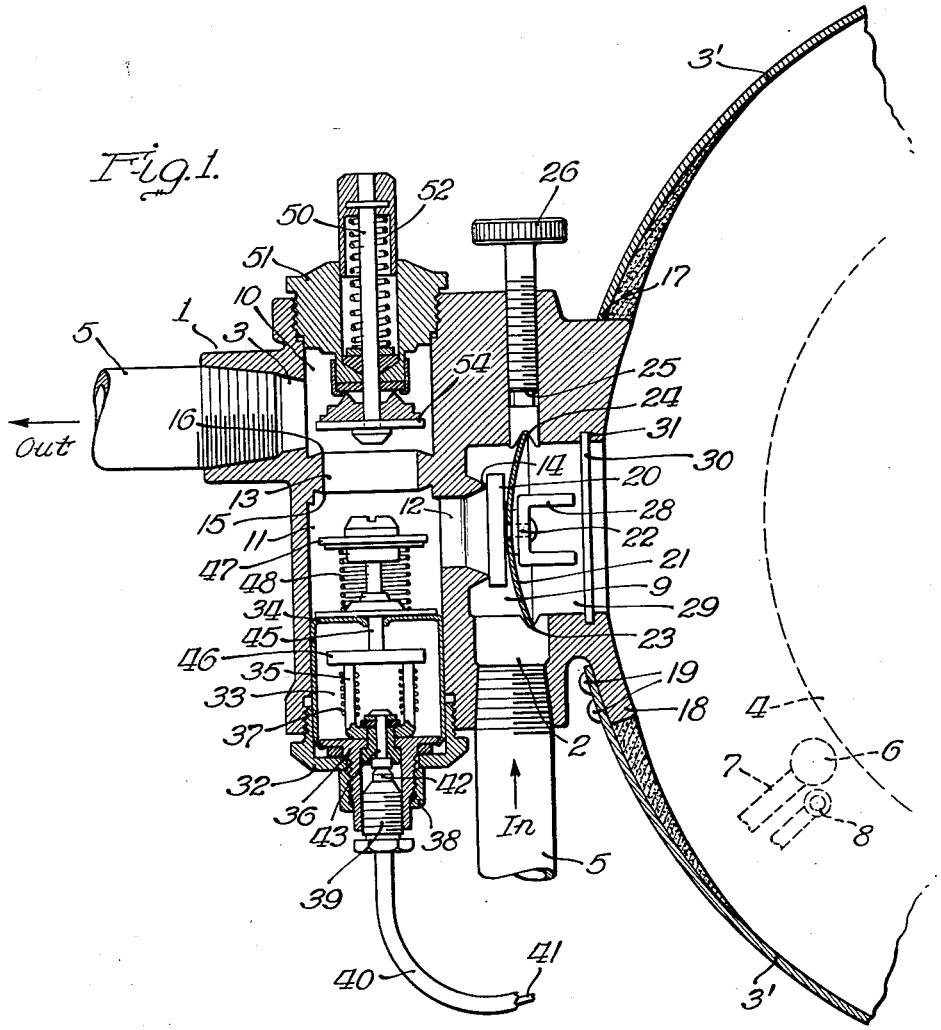
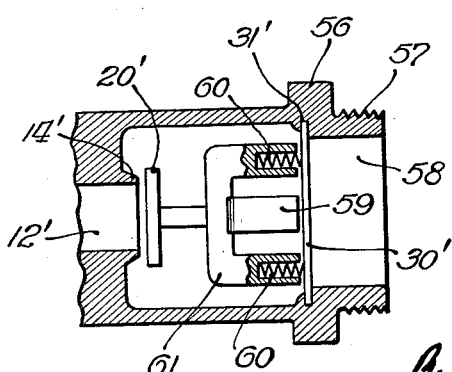
INVENTOR.
Martin J. Arvin Patented May 18, 1954

2,678,774

UNITED STATES PATENT OFFICE 2,678,774

THERMOMAGNETIC CONTROL DEVICE

Martin J. Arvin, Carterville, Ill., assignor to Milwaukee Gas Specialty Company, Milwaukee, Wis., a corporation of Wisconsin Application October 18, 1950, Serial No. 190,787

8 Claims. (Cl. 236—21)

This invention relates, in general, to control devices, and has particular relation to an improved thermomagnetic control device for controlling the flow of fuel, and, more particularly, the flow of gas for a burner.

While the particular embodiments of the invention which I shall describe hereinafter in connection with the drawing are adapted for use as water heater controls, it is to be understood that the present invention is not limited to such use but may be employed for other purposes as suitable or desired.

In prior practice it has been customary to provide a control device for shutting off the flow of fuel to the main burner of a water heater when an undesirable or dangerous or other condition arises. For example, control devices have been provided for shutting off the flow of fuel to the main burner at a predetermined temperature of the water to prevent an undesired rise in such temperature.

These prior devices have commonly employed thermostats of the rod and tube type, or thermostats of the bellows type or other forms of thermostats in which expansion and contraction with change of temperature have been utilized to effect the desired control.

One of the main objects of the present invention is to provide an improved thermomagnetic control device in which the valve or other control member is controlled by a Curie point member.

Another and more specific object of the invention is to provide a Curie point control in which the desired control is obtained by the simple expedient of a permanent magnet secured or connected to the valve or control member and a cooperating Curie point member which is placed in operating relation to the water heater and quite closely follows the temperature thereof.

Another object of the invention is to provide an improved temperature selecting adjustment for adjusting the thermomagnetic control device to shut off the heater or the flow of fuel at different selected temperatures.

Another object of the invention is to provide an improved combination of the thermomagnetic control device with a thermoelectric safety shut-off device whereby to shut off the flow of fuel to the main burner whenever a flame, such as a pilot flame, to which a thermoelectric generator is subjected is extinguished as well as when the temperature rises to that for which the thermomagnetic control device is set.

Another object of the invention is to provide a device of simple and inexpensive construction which is composed of few parts and adapted for convenient assembly and installation, and to operate effectively for the desired purpose.

Further features and advantages and numerous adaptations of the invention will be apparent from the following detailed description and the accompanying drawing.

In the drawing:

Figure 1 is an axial sectional view through a control device embodying the present invention showing the same applied to the wall of a water heater; also showing schematically and in plan view a portion of the burner for the heater, a thermoelectric generator for the control device, and a pilot burner; and Figure 2 is a fragmentary sectional view through a modified form of device embodying the present invention.

Referring now to the drawing, the embodiment of the invention selected for illustration in Figure 1 comprises a valve body or casing 1 having a fuel inlet 2 and a fuel outlet 3.

The wall or shell of a water heater is shown fragmentarily at 3', and a portion of the main burner for the water heater is shown schematically and in dotted lines in plan view at 4. A fuel supply pipe 5 leads to the burner 4 for the delivery of gaseous fuel thereto, for example, through a mixing chamber (not shown) to which air is admitted, as well understood in the art. Contiguous sections of the fuel supply pipe 5 are connected to the inlet 2 and outlet 3 of the valve body.

A pilot burner 6 is located in juxtaposition to the main burner 4 for igniting the same. The pilot burner 6 is supplied with gaseous fuel by a pilot burner fuel supply pipe 7. A thermo-electric generator 8 is disposed with its hot junction or junctions in the flame of the pilot burner, or in position to be heated by the pilot burner flame when the pilot burner 6 is ignited.

The inlet 2 opens into an inlet chamber 9 and outlet 3 opens from an outlet chamber 10. Between the chambers 9 and 10 there is an intermediate chamber 11. Internally the valve body has a pair of openings, one such valve opening 12 providing communication between the inlet chamber 9 and intermediate chamber 11, and the other valve opening 13 provides communication between the intermediate chamber 11 and the outlet chamber 10. An annular valve seat 14 surrounds the inlet side of opening 12, and annular valve seats 15 and 16 surround the intermediate and outlet sides of the opening 13.

One side of the valve body 1 extends through a suitable opening 17 in the wall or shell 3' of the water heater and may be secured in place, for example, by a flange 18 and rivets 19, or otherwise as suitable or preferred. If desired, suitable thermomastic material may be placed in proximity to the Curie point member, to be presently described, and the joints between this member and the valve body 1 and between the valve body 1 and the heater wall effectively to seal all joints.

A valve member 20 is adapted to seat on the valve seat 14 to shut off the supply of fuel to the main burner. This valve member 20 is attached to one side of a leaf spring 21, for example, by a rivet 22. The spring 21 engages at one end in a notch 23 in the valve body 1, and the opposite end of the spring 21 engages in a notch 24 in the inner end of a leak-proof screw 25 which is screwed into the valve body 1. The outer end of the screw 25 has a knob or finger piece 26 for rotating the screw. The spring 21 may be bowed and thereby tensioned different amounts, as will presently appear, by screwing the screw 25 into and out of the valve body 1. This spring 21 serves to bias the valve member 20 into engagement with the valve seat 14 to shut off the flow of fuel to the main burner 4.

A permanent magnet 28 shown in the form of a small U-shaped magnet has its base secured to the opposite side of the spring 21, for example, by the rivet 22. The inlet chamber 9 has an opening or window 29 which opens into or toward the interior of the wall of the heater, and a plate 30 is secured marginally in this opening at 31. This plate 30 is formed of suitable Curie point metal, and quite closely follows the temperature of the water in the heater. The plate 30 not only forms a part of the magnetic circuit, but it may also form a fluid-tight closure for the opening or window 29. The pole ends of the magnet 28 are presented toward the plate 30, and are positioned in appropriate relation thereto.

It will be apparent from the description thus far set forth that as long as the temperature of the water in the heater, and therefore the temperature of the plate 30, are below the Curie point of the plate 30, the flux of the magnet 28 may pass through the plate 30. The result of this is that the magnet 28 will then be attracted to the plate 30, thus moving the valve member 20 to the right as the device is shown in the drawing, and thereby to open position against the tension of the spring 21. The magnet 28 will be retained attracted to the Curie point plate 30, and valve member 20 will thus be retained in open position as long as the temperature of the water in the heater, and therefore the temperature of the Curie point plate 30, are below the Curie point of this plate.

When the temperature of the water in the heater and thereby the temperature of the plate 30 approaches the Curie point of the plate 30, this plate becomes non-magnetic, or substantially non-magnetic. As a result, the flux of the magnet 28 passing through the Curie point plate 30 decreases, and the magnetic attraction between the plate 30 and the magnet 28 is reduced to a value such that the tension of spring 21 causes the magnet 28 to be released from the plate 30. The spring 21 thereupon immediately snaps the valve member 20 to the closed position.

The device may be adjusted so that the valve member 20 will close at different temperatures by turning the screw 25 to place different tensions in the spring 21. For example, by increasing the tension in the spring 21 the valve member 20 will close at a lower temperature, and by decreasing the tension in the spring 21 the valve member 20 will close at a higher temperature.

Screwed or otherwise secured in the valve body 1 in axial alignment with the intermediate chamber 11 is a magnet mounting nut 32. An electromagnet 33 is enclosed within an inner shell 34 and comprises a magnet frame 35 secured, for example, to a terminal bushing 36. A coil is provided at 37. The bushing 36 is clamped in place, for example, by a nut 38, and has a threaded opening for receiving an attaching nut 39 of a thermoelectric generator lead. The lead comprises, for example, concentric lead conductors 40 and 41 connected in circuit at one end with the thermoelectric elements of the thermoelectric generator 8. The opposite end of the inner lead conductor 41 has a connector cone 42 which is clamped in contact with a terminal tip 43 by the nut 39. The outer tubular lead conductor 40 is connected in circuit with one side of the coil 37 through the bushing 36, and the other side of the coil 37 is connected to the inner lead conductor 41 through the terminal tip 43.

A stem 45 extends through the wall at the inner end of the shell 34 and has an armature 46 attached thereto within the shell 34, and preferably in a manner to permit self-accommodation of the armature to the pole ends of the magnet frame 35. A safety shut-off valve member 47 is attached to the opposite end of the stem 45 within intermediate chamber 11, and preferably in a manner to permit self-accommodation of this valve member to its seat 15.

The heat of the pilot burner flame on the thermoelectric generator 8 is adapted to energize the electromagnet 33 sufficiently to hold the armature 46 in attracted position and the valve member 47 in open position as long as the thermoelectric generator is heated by the flame of the pilot burner. When the pilot burner flame is extinguished, the armature ceases to be held by the electromagnet and the valve member 47 is moved by a coiled spring 48 into closed position engaging the valve seat 15 to shut off the flow of gaseous fuel to the main burner 1.

The heat of the flame of the pilot burner 6 on the hot junction or junctions of the thermoelectric generator 8 may not be capable of moving the armature 46 to attracted position and the valve member 47 to open position. Reset means is therefore provided for resetting or cocking the armature 46 to attracted position and the valve member 47 to open position. This reset means comprises a reset stem 50 mounted for axial movement in an opening in a reset stem mounting nut 51 screwed or otherwise secured in an opening in the valve body. A coiled spring 52 holds the reset stem 50 in its outwardly projected position, and returns it to such position. When armature 46 is retracted and valve member 47 is closed and stem 50 is pressed inwardly, the inner end of this stem engages the valve and armature assembly and moves the valve member 47 to open position and the armature 46 to attracted position where they may be held until the thermoelectric generator 8 is heated by the pilot flame and has energized the electromagnet 33 sufficiently to hold the armature 46 attracted and the valve member 47 open, whereupon the reset stem may be released.

If desired, the reset stem may be provided with a flow interrupter valve 54 for seating against valve seat 16 to shut off the flow of gaseous fuel to the main burner 4 during the resetting operation and until valve member 47 is held open by the electromagnet 33 and reset stem 50 is released. The flow interrupter valve may, for example, be of the character more fully disclosed and claimed in Charles V. Hildebrecht Patent No. 2,114,446, patented April 19, 1938.

With the structure shown and described in the present application, the arrangement of the valve members 20 and 47 is such that the valve member 20 may close and open with the valve member 47 remaining in open position, and, at the same time, the valve member 47 will close whenever the pilot burner flame is extinguished and regardless of whether the valve member 20 is open or closed.

In Figure 2 there is shown a plug 56 threaded at 57 and adapted to be screwed through an opening in the wall or shell of the water heater, or to be inserted through an opening therein and secured in place by a nut (not shown) and appropriately sealed. The plug 56 has an opening or window 58, and the Curie point plate 30' is secured marginally in the plug at 31' as in the preceding embodiment of the invention and is directly exposed to the heat of the water within the shell or tank to respond substantially directly to the heat of the water or other medium being controlled.

In Figure 2 the permanent magnet is shown at 59, and coiled springs 60 are mounted in recesses in the legs of the magnet and valve carrier 61 and act against the Curie point plate 30' to separate the magnet 59 from the plate 30' and move the valve member 20' into closed position against valve seat 14' when the temperature reaches the Curie point of the plate 30'.

The embodiments of the invention shown in the drawing are for illustrative purposes only, and it is to be expressly understood that said drawing and the accompanying specification are not to be construed as a definition of the limits or scope of the invention, reference being had to the appended claims for that purpose.

I claim:

1. A safety shut-off device for fluid fuel burning apparatus having a heater provided with a wall and a burner for said heater, said device comprising a control device biased to fuel feed preventing position, holding means for retaining said control device in fuel feed permitting position against its bias, said holding means comprising a magnet and an armature cooperating to form a magnetic circuit, and connection between said magnet and said control device, said device being adapted to be positioned outside said heater with said armature exposed through the wall of said heater to the temperature therein at a location remote from said burner, said armature being of a material which is normally substantially magnetic but which becomes non-magnetic when heated above a predetermined temperature.

2. A safety shut-off device according to claim 1 wherein the bias of said control device to fuel feed preventing position is produced by a leaf spring carrying both said magnet and said control device.

3. A safety shut-off device according to claim 1 wherein the bias of said control device to fuel feed preventing position is produced by a leaf spring carrying both said magnet and said control device, said leaf spring being fixedly held at one end and coacting at its opposite end with a screw which is adjustable to adjust the tension in said spring and thereby the temperature at which said control device is actuated to its fuel feed preventing position.

4. A safety shut-off device according to claim 1 wherein said control device comprises a valve and the bias thereof to fuel feed preventing position is produced by a leaf spring extending between said valve and said magnet, and a connection extending through said leaf spring and connecting said magnet axially to said valve, said leaf spring being fixedly held at one end and coacting at its opposite end with a screw which is adjustable to adjust the tension in said leaf spring and thereby the temperature at which said control device is actuated to its fuel feed preventing position.

5. A safety shut-off device according to claim 1 wherein said control device comprises a valve and the bias thereof to fuel feed preventing position is produced by a leaf spring extending between said valve and said magnet, and a connection extending through said leaf spring and connecting said magnet axially to said valve, said leaf spring being fixedly held at one end and coacting at its opposite end with a screw which is adjustable to adjust the tension in said leaf spring and thereby the temperature at which said control device is actuated to its fuel feed preventing position, said screw being leak-proof to prevent escape of fuel.

6. A safety shut-off device according to claim 1 wherein there is a control body for attachment externally to the wall of the heater, said body being provided with a chamber in which said control device and magnet are disposed with said armature closing one end of said chamber for exposure to the interior of the heater through an opening in the wall of the heater when said body is attached to said wall.

7. A safety shut-off device according to claim 1 wherein the bias of said control device to fuel feed preventing position is produced by spring means interposed between and coacting with said magnet and with said armature.

8. A safety shut-off device for fluid fuel burning apparatus having a heater provided with a wall, a main burner and a pilot burner, said device comprising a control device biased to fuel feed preventing position, holding means for retaining said control device in fuel feed permitting position against its bias, said holding means comprising a magnet and an armature cooperating to form a magnetic circuit, a connection between said magnet and said control device, said device being adapted to be positioned outside said heater with said armature exposed through the wall of said heater to the temperature therein at a location remote from said heater, said armature being of a material which is normally substantially magnetic but which becomes non-magnetic when heated above a predetermined temperature, and a thermoelectric safety shut-off device in series with said control device and responsive to the heat of the flame of said pilot burner.

References Cited in the file of this patent

UNITED STATES PATENTS

| Number | Name | Date |
|---|---|---|
| 1,523,351 | Schwimmer | Jan. 13, 1925 |
| 1,922,720 | Vaughn | Aug. 15, 1933 |
| 1,977,656 | Vaughn | Oct. 23, 1934 |
| 2,114,446 | Hildebrecht | Apr. 19, 1938 |
| 2,299,155 | Lange | Oct. 20, 1942 |
| 2,303,702 | Mantz | Dec. 1, 1942 |
| 2,339,087 | Mantz | Jan. 11, 1944 |
| 2,390,985 | Boyer | Dec. 18, 1945 |
| 2,584,458 | Hurlbut | Feb. 5, 1952 |